(12) United States Patent
Braithwaite

(10) Patent No.: US 7,110,739 B2
(45) Date of Patent: Sep. 19, 2006

(54) MULTI-TRANSMITTER COMMUNICATION SYSTEM EMPLOYING ANTI-PHASE PILOT SIGNALS

(75) Inventor: Richard Neil Braithwaite, Orange, CA (US)

(73) Assignee: Powerwave Technologies, Inc., Santa Ana, CA (US)

( * ) Notice: Subject to any disclaimer, the term of this patent is extended or adjusted under 35 U.S.C. 154(b) by 0 days.

(21) Appl. No.: 10/818,546

(22) Filed: Apr. 5, 2004

(65) Prior Publication Data

US 2004/0204100 A1    Oct. 14, 2004

Related U.S. Application Data

(60) Provisional application No. 60/462,148, filed on Apr. 10, 2003.

(51) Int. Cl.
H04B 1/06    (2006.01)

(52) U.S. Cl. .................. 455/276.1; 330/151; 455/103; 455/105; 455/116

(58) Field of Classification Search ............... 375/259, 375/260, 267, 297, 295, 296, 146; 455/126, 455/127, 114, 103, 105, 116, 118, 67, 139, 455/205, 251.1, 276.1; 330/151, 149

See application file for complete search history.

(56) References Cited

U.S. PATENT DOCUMENTS

| | | | |
|---|---|---|---|
| 3,681,695 A | 8/1972 | Cease et al. | |
| 3,896,395 A | 7/1975 | Cox | |
| 3,974,447 A * | 8/1976 | Lofmark | 455/10 |
| 4,090,147 A | 5/1978 | Seidel | |
| 4,794,343 A | 12/1988 | Yang | |
| 5,913,152 A | 6/1999 | Hemphill | |
| 6,208,204 B1 * | 3/2001 | Suzuki et al. | 330/52 |
| 6,275,106 B1 | 8/2001 | Gomez | |
| 6,313,703 B1 | 11/2001 | Wright et al. | |
| 6,452,446 B1 | 9/2002 | Eisenberg et al. | |
| 6,553,211 B1 * | 4/2003 | Zhou | 455/126 |
| 6,614,298 B1 | 9/2003 | Blodgett | |
| 6,674,324 B1 * | 1/2004 | Ocenasek et al. | 330/52 |
| 2002/0008577 A1 * | 1/2002 | Cova et al. | 330/52 |
| 2002/0048326 A1 * | 4/2002 | Sahlman | 375/297 |
| 2003/0001669 A1 | 1/2003 | Billsberry | |
| 2003/0012299 A1 * | 1/2003 | Kuchi et al. | 375/299 |
| 2003/0090319 A1 * | 5/2003 | Ohkawa | 330/52 |

* cited by examiner

*Primary Examiner*—Edward F. Urban
*Assistant Examiner*—Tu X. Nguyen
(74) *Attorney, Agent, or Firm*—David L. Henty; Myers Dawes Andras & Sherman LLP

(57) ABSTRACT

Base station transmitter signals are combined more effectively through the use of anti-phase pilots between pairs of transmission paths. At the combiner, the pilots will cancel when the amplitude, phase, and delay of the two transmission paths entering the combiner are matched. As a result, the pilots will not appear at the output except when the alignment is incorrect. By detecting the residual pilot at the combiner output, the information is used to adjust the alignment of one of the transmission paths to match the other. The adjustments to the amplitude, phase, and delay are performed on the input signal, after the pilot injection.

30 Claims, 7 Drawing Sheets

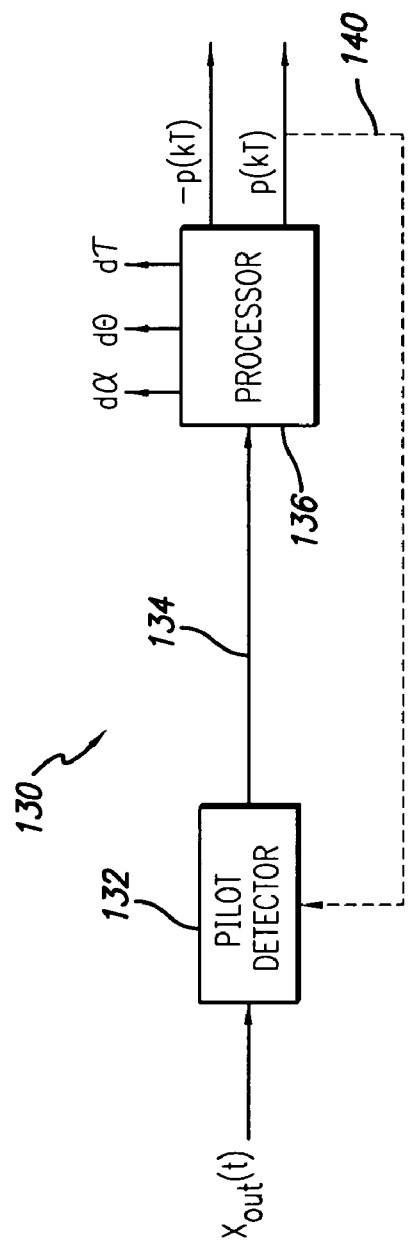
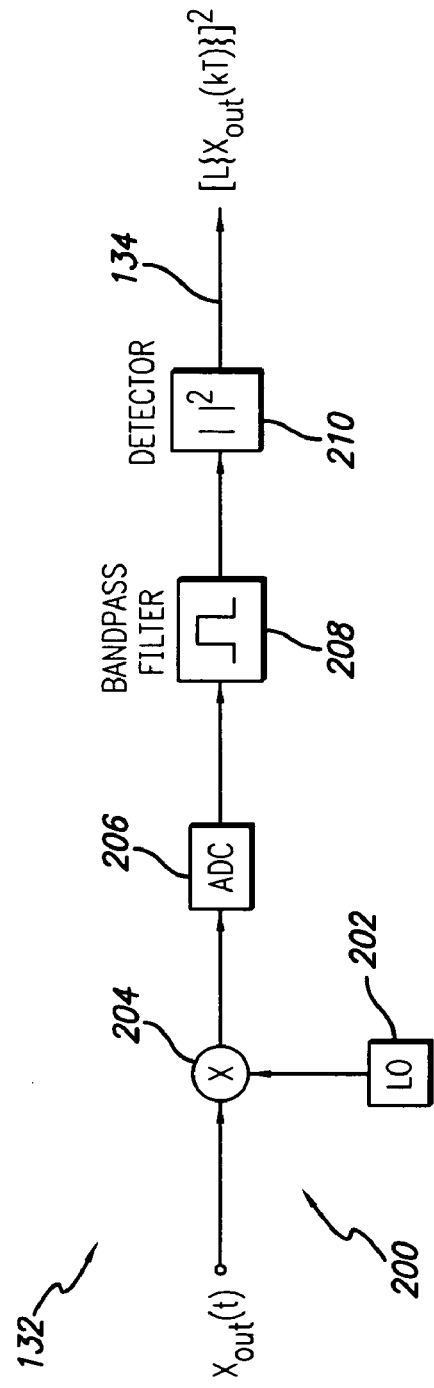

MULTI-TRANSMITTER COMMUNICATION SYSTEM EMPLOYING ANTI-PHASE PILOT SIGNALS

RELATED APPLICATION INFORMATION

The present application claims the benefit under 35 USC 119(e) of provisional application Ser. No. 60/462,148, filed Apr. 10, 2003, the disclosure of which is incorporated by reference in its entirety.

BACKGROUND OF THE INVENTION

1. Field of the Invention

This invention relates to the field of wireless communication systems and methods and more specifically cellular base station transmission. In particular, the invention relates to systems and methods for combining the outputs of power amplifiers that are part of transmitter modules to increase the available radio frequency (RF) power.

2. Description of the Prior Art and Related Background Information

In cellular base stations, the RF outputs of power amplifiers are often combined to increase the power delivered to the antenna. Since the power amplifiers are amplifying the same signal, combining is most effective when the power amplifiers' transfer characteristics are matched in terms of amplitude, phase, and delay. The combiner is referred to as 'aligned' under such conditions. In practice it is difficult to maintain such multi-transmitter systems perfectly aligned, however. Variations in operating conditions will affect the two (or more) transmitters slightly differently since it is impossible to make the transmitters completely identical. For example, as temperature or input power levels vary, the transmitters will typically respond slightly differently causing a misalignment at the output combiner. This in turn causes destructive signal combination and wasted power. Also, unwanted signal distortion may be introduced.

Accordingly, a need presently exists for an effective and inexpensive way to maintain alignment in multi-transmitter systems.

SUMMARY OF THE INVENTION

In a first aspect the present invention provides a wireless communication system, comprising an input for receiving a communication signal, a first signal transmission path coupled to the input and including a first power amplifier and a second signal transmission path coupled to the input and including a second power amplifier. The first signal transmission path includes a first pilot signal input receiving a first pilot signal and the second signal transmission path includes a second pilot signal input receiving a second pilot signal out of phase with the first pilot signal. A combiner couples the output of the first and second signal transmission paths to provide a higher power output. A pilot detector is coupled to the output of the combiner and detects any uncanceled pilot signal corresponding to misalignment of the signal transmission paths.

In a preferred embodiment of the wireless communication system, a signal adjuster is provided in the first or second signal transmission path for adjusting at least one of the gain, phase or delay of the signal transmission path. A control processor is coupled to the pilot detector and the signal adjuster and controls the signal adjuster to minimize the detected pilot signal. The input communication signal may be a digital signal and each of the first and second signal transmission paths further comprise a digital to analog converter and an up converter coupled between the input and the first and second power amplifier, respectively. In this embodiment, the first and second pilot signals are preferably digital signals. Alternatively, the input communication signal may be an analog RF signal. In such an analog RF input signal embodiment, at least one of the first and second signal transmission paths may optionally further comprise a down converter, an analog to digital converter, a digital to analog converter, and an up converter, coupled between the input and the power amplifier.

Several embodiments of the pilot detector may be employed. For example, the pilot detector may comprise a down converter, a bandpass filter, and a signal power detector. An analog to digital converter may be coupled between the down converter and the bandpass filter and the pilot power detection may be performed in the digital domain. Alternatively, the pilot power detection may be performed in the analog domain and an analog to digital converter may be coupled to the output of the signal power detector. In an alternate embodiment, the pilot detector may comprise a first input receiving the output of the combiner, a second input receiving the first pilot signal and a correlation detector. For example, the correlation detector may comprise a first filter coupled to the first input, a second filter coupled to the second input, and a mixer for mixing the outputs of the first and second filters. The pilot detector may further comprise a down converter and an analog to digital converter coupled between the first input and the first filter. As a more specific example, the correlation detector may comprise a first Fast Fourier Transform circuit coupled to the first input, a second Fast Fourier Transform circuit coupled to the second input, a first weighting circuit coupled to the output of the first Fast Fourier Transform circuit, a second weighting circuit coupled to the output of the second Fast Fourier Transform circuit, and a mixer coupled to the outputs of the first and second weighting circuits.

In another aspect the present invention provides a multi-transmitter communication system, comprising an input for receiving a communication signal, a plurality of transmitter modules coupled to the input, each comprising a power amplifier, and a combiner receiving and combining the outputs of the plural transmitter modules. A pilot signal source is coupled to the plurality of transmitter modules and provides a respective plurality of pilot signals having relative phases so as to combine in an out of phase manner at the combiner when the transmitter modules are aligned.

In a preferred embodiment of the multi-transmitter communication system, the pilot signal source provides plural pilot signals to one transmitter module and anti-phase pilot signals to the remaining plurality of transmitter modules, in a star configuration. Alternatively, the pilot signal source may provide the pilot signals evenly to the plurality of transmitter modules in a ring configuration. Preferably, the pilot signal source provides the pilot signals to pairs of transmitter modules. At least one of the transmitter modules preferably receives two or more pilot signals and anti-phase pilot pairs appear in two or more of the remaining transmitter modules. Also, the pilot signals may preferably be multiplexed.

In a further aspect the present invention provides a method for aligning a communication system comprising at least first and second power amplifier modules in respective parallel signal paths receiving and amplifying an input signal, and a combiner combining the amplifier module output signals. The method comprises providing out of phase pilot signals to respective ones of the parallel signal paths, so that the pilot signals combine out of phase when the system is aligned. The method further comprises detecting any residual pilot signal at the combiner output and adjusting at least one of the signal paths to minimize the detected pilot signal.

In a preferred embodiment of the method for aligning a communication system detecting any residual pilot signal may comprise detecting pilot signal power. Alternatively, detecting any residual pilot signal may comprise detecting correlation between the pilot signal and the combiner output. Preferably adjusting at least one of the signal paths comprises altering the gain, phase or delay of at least one of the signal paths. More specifically, the adjusting preferably comprises altering the gain, phase or delay and monitoring pilot power to determine a desired adjustment direction. The gain, phase or delay is preferably adjusted in increments in the desired direction until the detected pilot power reaches a minimum. In an embodiment where the correlation between the pilot signal and the combiner output is detected, the correlation is a complex number and the adjusting of at least one of the signal paths may comprise incrementally adjusting the transfer characteristic of at least one of the signal paths using the detected correlation. The incremental adjustment may employ a step size proportional to the magnitude of the complex number and a direction corresponding to the sign of the complex number. Detecting correlation may comprise filtering the pilot and the combiner output and mixing the two filtered signals.

Further features and advantages of the present invention will be appreciated from the following detailed description of the invention.

BRIEF DESCRIPTION OF THE DRAWINGS

FIG. 1B is a block schematic drawing of a combiner alignment control system, in accordance with a preferred embodiment of the present invention.

FIG. 2 is a first embodiment of a pilot detector employed in the combiner alignment control system of FIG. 1B.

DETAILED DESCRIPTION OF THE INVENTION

Figure 1A:
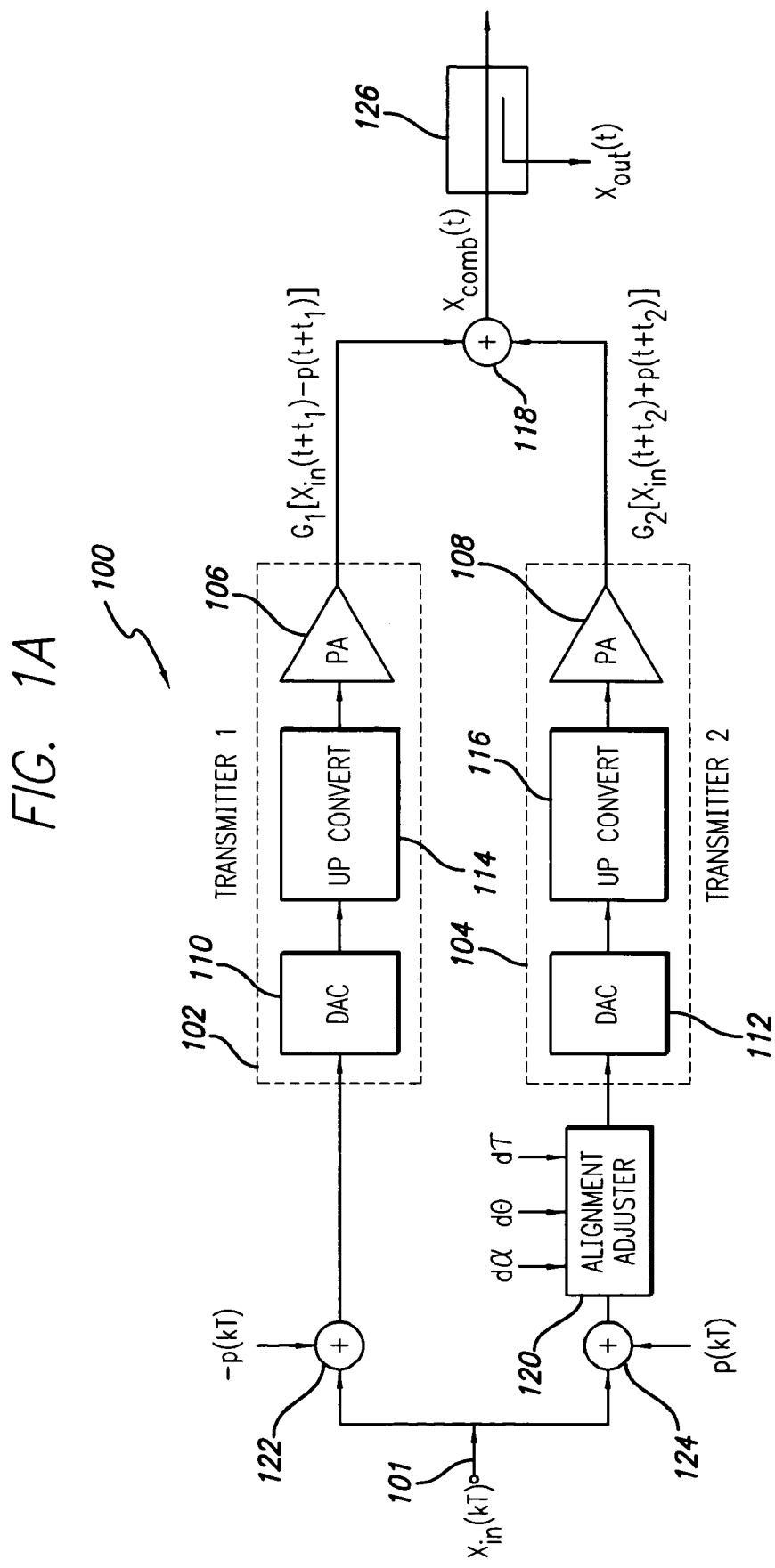
FIG. 1A is a block schematic drawing of a wireless transmission system.

Referring to FIG. 1A and 1B a multi-transmitter communication system in accordance with the present invention is illustrated. FIG. 1A illustrates the basic multi-transmitter architecture and FIG. 1B illustrates the combiner alignment control system. FIG. 1A illustrates a system with two transmitters being combined, however, more than two transmitters may also be combined. The more general case of combining three or more transmitter modules is discussed below in relation to FIGS. 6 and 7.

FIG. 1A and 1B illustrate a multi-transmitter communication system 100 adapted for use with a digital input communication signal. (An alternate embodiment receiving an analog input signal will be described below in relation to FIG. 8.) Two transmitter modules 102, 104 receive and amplify the input signal $x_{in}(kT)$ provided at input 101. Power amplifier's 106, 108 are integrated into the respective transmitter modules along with digital-to-analog converters (DAC's) 110, 112 and up-converters 114, 116. The transmitter modules thus have a digital input and an RF output. The transmitter modules outputs are combined at combiner 118 for increased power and an output $x_{comb}(t)$ is provided.

The individual signal transfer characteristics can be adjusted while the signal is in a digital form for optimal combining. To maximize the combiner efficiency the difference in amplitude, phase, and delay between transmitter modules should be minimized. These characteristics are adjusted by alignment adjuster circuit 120. To measure misalignment and control the alignment adjustment, a pilot signal is generated digitally in both transmitter module signal paths at pilot combiners 122, 124. The pilots have opposite phases so that the residual pilot after the combiner 118 is zero if the amplitude, phase, and delay are matched, as shown by pilot signals $p(kT)$ and $-p(kT)$ in FIG. 1A. A directional coupler 126 (for example, 20 dB coupling ratio) is used to extract a portion of the output signal, denoted by $x_{out}$, for the purpose of measuring the pilot residual after combining. Any residual pilot energy detected at the output will be a function of the misalignment.

Referring to FIG. 1B the combiner alignment control system 130 is illustrated in a block schematic drawing. The control system 130 employs a pilot detector circuit 132 which receives the sampled output $x_{out}$ from coupler 126 and detects any residual pilot signal in the output. Several specific embodiments of pilot detector 132 will be described below. Pilot detector 132 provides a digital signal on line 134, representative of the detected residual pilot, to processor 136. Processor 136 provides adjustment settings to the alignment adjuster 120 (FIG. 1A) to minimize the detected pilot 134. In particular, digital gain (dα), phase (dθ) and delay (dτ) settings may be provided to control the signal on at least one of the two signal paths to minimize the detected pilot and align the signals at combiner 118 (FIG. 1A). Processor 136 may employ a suitable search algorithm, described below, to adjust the gain, phase and delay while monitoring detected pilot, and look for minimum settings. Also, as shown, processor 136 may also digitally generate the anti-phase pilot signals $p(kT)$ and $-p(kT)$. Also, the digital pilot may be provided to pilot detector 132 (dashed line 140) in an embodiment of pilot detector 132 using correlation detection of residual pilot in signal $x_{out}$ (which embodiment is described below in relation to FIG. 4).

The use of the anti-phase pilots to align the transmitters for optimal coupling at combiner 118 may be better appreciated by following the signal flows through the system. The RF output of an individual transmitter path is:

$$y_i(t) = G_i \cdot [x_{in}(t+t_i) - p(t+t_i)] \quad \text{(Eq. 1)}$$

where $t_i$ and $G_i$ are the delay and complex gain of transmitter module i; $x_{in}(t)$ and $p(t)$ are the input and pilot signals, respectively, after being converted to analog and up-converted to RF. The complex gain comprises amplitude and phase components, denoted below as $\alpha_i$ and $\theta_i$, respectively:

$$G_i = exp[\alpha_i + j\theta_i].  \quad (Eq.\ 2)$$

Assuming that the transmitter module 1 is used as a reference (setting $t_1=0$ for convenience), the combined output is $$x_{comb}(t) = x_A(t) + x_B(t) + x_C(t) + x_D(t) \quad (Eq.\ 3)$$

where $$x_A(t) = G_1 \cdot [x_{in}(t) + x_{in}(t+d\tau)] \quad (Eq.\ 4)$$

$$x_B(t) = G_1 \cdot [p(t) - p(t+d\tau)] \quad (Eq.\ 5)$$

$$x_C(t) \approx (d\alpha + jd\theta) \cdot G_1 \cdot x_{in}(t+d\tau) \quad (Eq.\ 6)$$

$$x_D(t) \approx (d\alpha + jd\theta) \cdot G_1 \cdot p(t+d\tau) \quad (Eq.\ 7)$$

and $d\tau = t_2 - t_1$; and $(d\alpha + jd\theta) = (\alpha_2 - \alpha_1 + j\theta_2 - j\theta_1)$, which is approximately equal to $(G_2/G_1) - 1$. For the case when the delays are matched ($d\tau = 0$), the amplitude and phase misalignments, $d\alpha$ and $d\theta$, are proportional to the residual pilot signal appearing at the combiner output. For small delay mismatches and a narrow bandwidth pilot signal, (Eq. 7) can be rewritten as $$x_D(t) \approx (d\alpha + jd\theta + j\omega_p d\tau) \cdot G_1 \cdot p(t) \quad (Eq.\ 8)$$

where $\omega_p$ is the center RF frequency of the pilot.

The measurement of the misalignment is based on extracting the $x_D(t)$ component from the combiner output signal. The extraction preferably uses a set of bandpass filters that individually make the approximation (Eq. 8) valid. The methods for detecting the pilot at the output sample preferably employ narrow bandwidth processing combined with either power detection or with correlation.

In the first embodiment of the pilot detector 132, shown in FIG. 2, narrow bandwidth power detection uses filtering to isolate the pilot from the sampled RF signal, $x_{out}(kT)$. As shown, the output sampled signal is first down-converted to a lower frequency using a down converter 200, comprising local oscillator (LO) 202 and mixer 204. The down converted signal is then converted into a digital (sampled) format by an analog to digital converter (ADC) 206. Then digital signal processing is applied to filter and power detect the pilot signal. This processing may be provided by bandpass filter 208 and power detector 210, which may be discrete circuits or this processing may be implemented in a DSP (digital signal processor). The detected pilot power is:

$$P_{pilot}(kT) = \Sigma |L\{x_{out}(kT)\}|^2 \quad (Eq.\ 9)$$

where $x_{out}(kT)$ is an output sample that has been down-converted and digitized and $L\{\ \}$ is a linear filtering operation that notches the input signal. That is, $$\Sigma |L\{x_{in}(kT)\}|^2 \approx 0 \quad (Eq.\ 10)$$

and $$\Sigma |L\{p(kT)\}|^2 > 0 \quad (Eq.\ 11)$$

The pilot signal and filter should be chosen to fulfill (Eq. 10) and (Eq. 11). The filter 208 is preferably a set of narrow bandwidth filters offset in frequency. The filters can be enabled or disabled if pilot hopping is used. The output power is output as a digital signal on line 134, to processor 136 (FIG. 1A).

Figure 3:
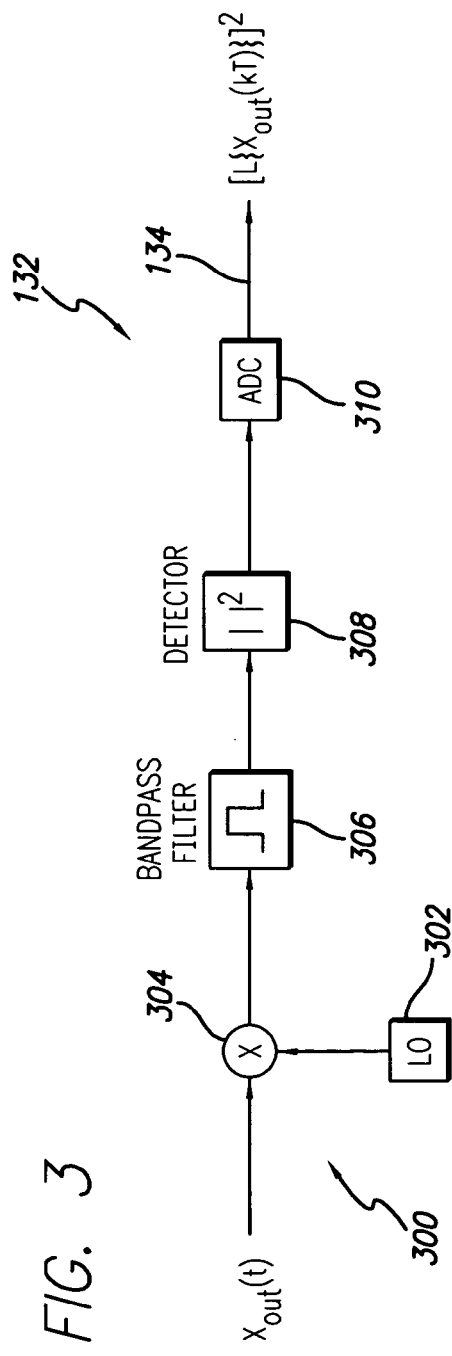
FIG. 3 is a second embodiment of a pilot detector employed in the combiner alignment control system of FIG. 1B.

A second alternative embodiment of the pilot detector 132 is shown in FIG. 3. The sampled output $x_{out}(t)$ is down-converted by down converter 300, comprising local oscillator 302 and mixer 304. The down converted signal is then filtered by bandpass filter 306 and the power of the pilot signal is detected by power detector 308. These processes are performed in the analog domain but may implement the same basic detecting function described above in relation to equations (9)–(11). After the sampled output signal is down converted, filtered and the pilot power is detected, the output of power detector 308 is then converted to a digital format by ADC 310 and output on line 134.

There are many variations of the two embodiments of the pilot detector described in relation to FIGS. 2 and 3 as will be apparent to those skilled in the art. For example, filtering and detection can be performed on the RF signal directly, eliminating the down conversion within the second embodiment.

In a third embodiment of pilot detector 132, a correlation method may be employed. The correlation method is:

$$C_n = \Sigma L_n\{x_{out}(kT)\} \cdot L_n\{p^*(kT+\tau)\} dt \quad (Eq.\ 12)$$

where $\tau$ is the nominal time delay between the pilot injection and the output sample and $L_n\{\ \}$ represents a linear operation. The nominal time delay between the input signal and the output sample maximizes $$A_n(\tau) = \sum_k x_{out}(kT) \cdot x_{in}^*(kT+\tau) dt. \quad (Eq.\ 13)$$

The linear operations used in (Eq. 12) may include bandpass filtering to allow the narrow bandwidth approximation to be used (see (Eq. 8)). The pilot and linear operations are selected such that $$\Sigma L_n\{x_{in}(kT)\} \cdot L_n\{p^*(kT)\} dt \approx 0 \quad (Eq.\ 14)$$

and $$\Sigma L_n\{p(kT)\} \cdot L_n\{p^*(kT)\} dt > 0 \quad (Eq.\ 15)$$

for each n. In general, several correlations $C_n$ are computed using different filters in order to obtain sufficient information to estimate the gradient direction in the minimization process.

Figure 4:
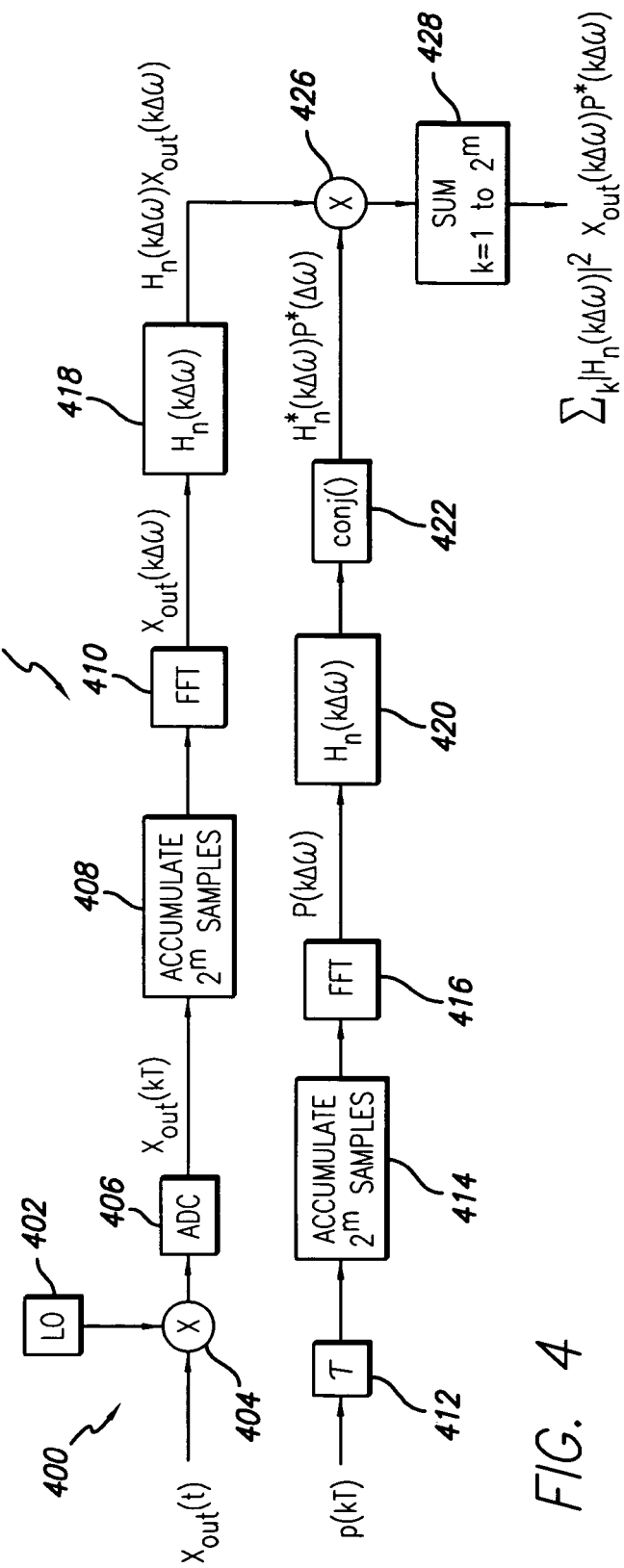
FIG. 4 is a third embodiment of a pilot detector employed in the combiner alignment control system of FIG. 1B.

One method of implementing a set of narrow bandwidth filters is to use a Digital Fourier Transform (DFT), preferably a Fast Fourier Transform (FFT). A FFT implementation of the correlation approach to pilot detector 132 is shown in FIG. 4. As shown in FIG. 4, the pilot detector receives both the pilot signal p(kT) (from processor 136 as shown in FIG. 1B) and the sampled output $x_{out}(t)$, to perform a correlation detection of the residual pilot in the output. The sampled output is provided on a first signal path including a down converter 400, comprising local oscillator 402 and mixer 404, and an analog to digital converter 406. A desired number of samples for performing the correlation are accumulated, e.g. in a shift register or other data accumulator 408, and a FFT function is implemented on the sampled signal by FFT circuit 410, which may be a discrete circuit or implemented in a DSP. In the second signal path the pilot is delayed by a suitable delay circuit 412 to match the delay on the first signal path. Then the desired number of pilot samples are accumulated at accumulator 414 and a FFT function is performed by circuit 416. After applying FFT's to both the output sample and the pilot, the Fourier coefficients are weighted using $H_n(k\Delta\omega)$ to obtain the best separation of input and pilot signals. This weighting is equivalent to filtering and may be implemented using discrete filters or a DSP, indicated as circuits 418, 420, in FIG. 4. Several filters can be employed to provide information to resolve amplitude, phase, and delay misalignments. The conjugate of the filtered pilot component is generated by a DSP or other digital circuit 422. This is multiplied with the filtered output sample at multiplier 426, and the result is summed at summing circuit 428 to obtain the correlation.

More specifically, let the FFT of $x_{out}(t)$, $p(t)$, and the filter impulse response be denoted by $X_{out}(k\Delta\omega)$, $P(k\Delta\omega)$, and $H_n(k\Delta\omega)$, respectively. The correlation in (Eq. 12) can be rewritten as $$C_n = \left[\sum_k |H_n(k\Delta\omega)|^2 \cdot X_{out}(k\Delta\omega) \cdot P^*(k\Delta\omega)\right].$$ (Eq. 16)

The expected value of (Eq. 16), denoted by $E[C_n]$, is $$E[C_n] = (d\alpha + jd\theta) \cdot [\Sigma_k |H_n(k\Delta\omega)|^2 \cdot |P(k\Delta\omega)|^2 \cdot \exp(jk\Delta\omega \cdot d\tau)]$$ (Eq. 17)

assuming that $$E\left[\sum_k |H_n(k\Delta\omega)|^2 \cdot X_{in}(k\Delta\omega) \cdot P^*(k\Delta\omega)\right] = 0.$$ (Eq. 18)

Proper choices of $p(kT)$ and $H_n(k\Delta\omega)$ ensure the above-mentioned condition, (Eq. 18), is valid. Although the FFT contains $2^m$ coefficients, there are not, in general, $2^m$ valid correlations. Many of the individual coefficients of $X_{out}(k\Delta\omega) P^*(k\Delta\omega)$, see (Eq. 16), are measuring the presence of the input signal, and do not fulfill the requirement listed in (Eq. 18). The proper filtering (weighted) provided by $|H_n(k\Delta\omega)|$ is important to isolate the residual pilot from the input signal.

Both the pilot power detection and correlation methods can be extended to allow the pilot and input signal to share the same bandwidth. Spectral spreading, frequency hopping, or code domain multiplexing may be used to ensure that the pilot is orthogonal to the input signal while sharing the available spectrum. That is, the pilot is a known spreading or code sequence that is orthogonal to the input signal over a known time interval. A de-spreading sequence is included as part of the pilot detection. For the case of the use of pilot power detection, the de-spreading operation is applied before the bandpass filtering (see FIG. 2). For the correlation method, de-spreading is applied to both the pilot and output signals before the FFT (or filtering) operation (see FIG. 4).

Once the misalignment has been measured, the transfer characteristic of one (or both) of the transmitter signal paths is adjusted. FIG. 1A shows the adjustment being made in the path of transmitter 2, after the injected pilot but before the digital-to-analog (DAC) converter 112. In this example, transmitter 1 is used as the reference transfer function. However, it may be necessary to adjust both transmitter paths if the reference values of amplitude, phase, and delay are specified.

An algorithm is employed to search the 3-dimensional space of amplitude, phase, and delay settings for the alignment resulting in the best pilot cancellation after combining. The preferred algorithm is dependent on the whether the measurement is obtained using pilot power detection or correlation approaches. Both algorithms are iterative in nature, producing a sequence of alignment settings that on average decrease the residual pilot power, converging towards the optimal setting.

Figure 5:
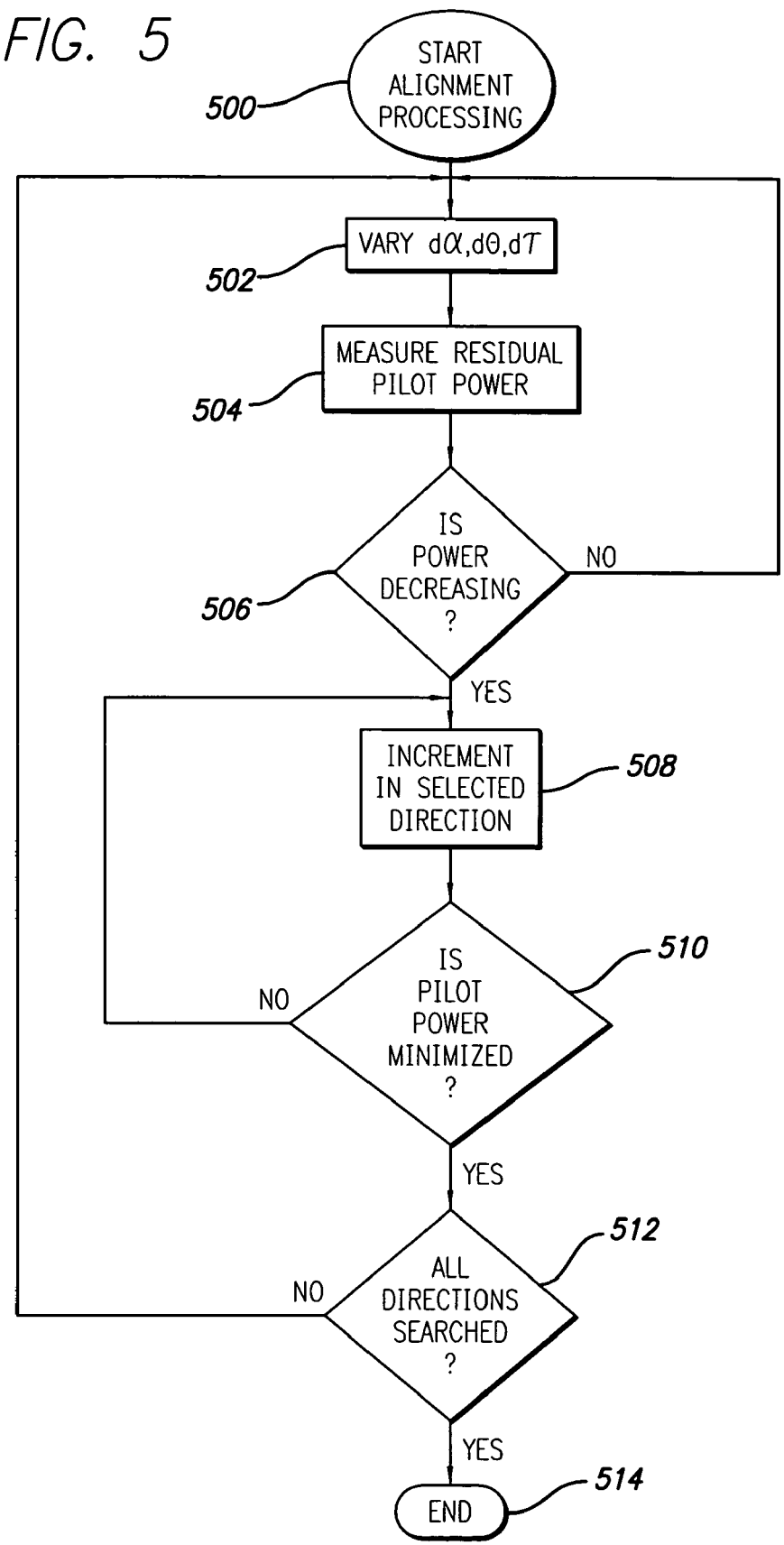
FIG. 5 is a flow diagram of an alignment algorithm in accordance with a preferred embodiment of the present invention.

A basic alignment process flow using pilot power detection is shown in FIG. 5. For the case of pilot power detection, the alignment adjustment preferably employs a search technique designed to both estimate the descent direction and to minimize the pilot power. At 500, the alignment process begins, e.g. at system start up or when large residual pilot power is detected. Varying any of the amplitude, phase, and/or delay controls in a known manner is next performed 502 while measuring the effect of the residual pilot power 504. This provides the descent direction. If the change in alignment reduces the residual pilot power, the selected descent direction is considered valid 506. The alignment is adjusted in increments (steps) in the descent direction 508 as long as the residual pilot power is reducing. This process continues until it is determined at 510 that a minimum of the pilot power has been reached for the selected direction. Once a minimum has been reached, at 512 the process flow checks if all directions have been searched. If the determination is no, then processing proceeds to select and search other directions as described in relation to 502–510 to reach the global minimum. In general, at least three directional searches are required to reach the global minimum, one for each dimension. (In some implementations more searches may be required, alternating directions, to overcome cross-correlations that exist in practical implementations of amplitude, phase, and delay shifters). One method of selecting directions is to search each coordinate ($\alpha$, $\theta$, $\tau$) separately. When all directions have been searched and pilot power is at a global minimum the process ends at 514 until a new alignment processing begins; for example, when misalignment is detected by an increase in pilot power. There are many known implementation details with respect to such a power minimization algorithm, such as step size selection, that are known by those skilled in the art. In particular, those skilled in the art of alignment algorithms used in feed forward compensated power amplifiers will appreciate various implementation details and variations in the basic algorithm of FIG. 5.

In the above-mentioned power minimization, it is important to choose a pilot signal that has sufficient 'richness' to detect the three parameters. The center frequency of the narrow bandwidth detection needs to be varied to resolve both phase and delay mismatches. That is, a single tone for a pilot is not sufficient because minimizing its power level constrains only two parameters (gain and phase). A second tone or a broad bandwidth pilot is preferably employed to constrain the delay. For the first embodiment of the pilot power detection (see FIG. 2) it is possible to obtain the required frequency diversity by implementing several band-pass filters concurrently using DSP processing. For the second embodiment, shown in FIG. 3, the frequency of the pilot generation and detection may hop over time to obtain the frequency diversity.

When correlation is used to detect the residual pilot, the step size and descent information are available from the measurements. That is, there is no need to test a given descent direction. Each correlation, $C_n$, is a complex number providing two measurements including the sign information. The step size is proportional to the amplitude and the sign indicates the descent direction. As in the power minimization case, frequency diversity is required to resolve both the phase and delay mismatches. By selecting different filters, additional independent measurements are available from the FFT-based correlations. As a result, there is sufficient information available for estimating the gradient descent direction and the step size. In general, if two independent correlations are available (whose filters have different center frequencies), the sum of the correlations ($C_1+C_2$) would constrain the amplitude and phase, and the difference ($C_1-C_2$) would constrain the delay (and the amplitude slope over frequency).

Next the case of three or more transmitter modules being combined will be described in relation to FIGS. 6 and 7. For the case of combining three or more transmitter modules two methods may be employed. The first method is used for the alignment of the modules; the second is used to detect imbalances.

To align three or more transmitters, the modules may be treated as pair-wise sets. By estimating the mismatch between transmitter module pairs, the set of transmitters can be aligned to a common reference. At least one of the transmitter modules would have two (or more) pilot signals where the anti-phase pilot pairs appear in two (or more) of the remaining modules. By multiplexing the pilot signals, it is possible to produce the desired anti-phase pairings. Multiplexing can be achieved using standard methods such as time-domain multiplexing, frequency-domain multiplexing, code-domain multiplexing, or combinations of the above-mentioned techniques.

Figure 6:
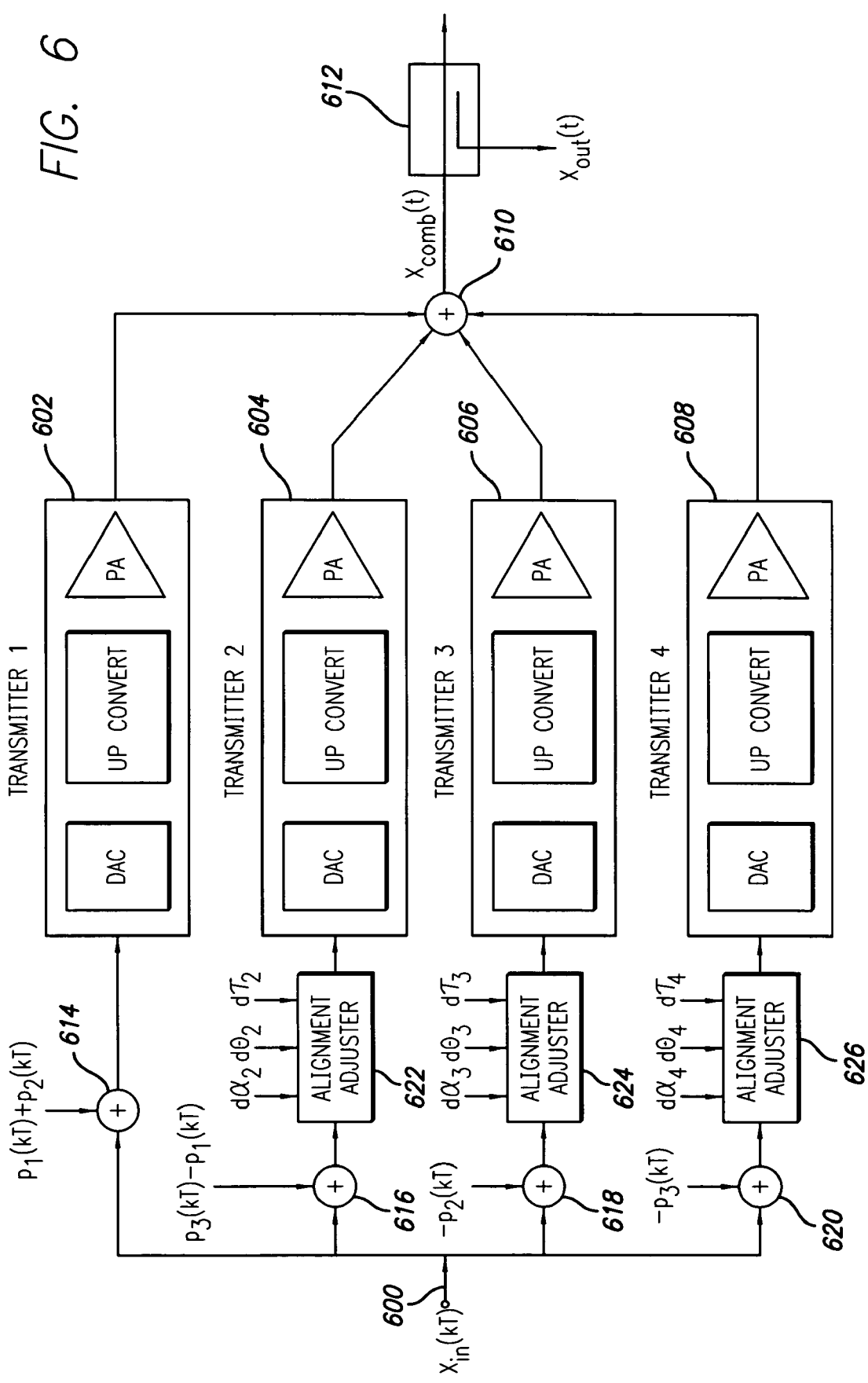
FIG. 6 is a block schematic drawing of a wireless transmission system in an alternate embodiment of the present invention employing multiple transmitter modules in a ring configuration.
Figure 7:
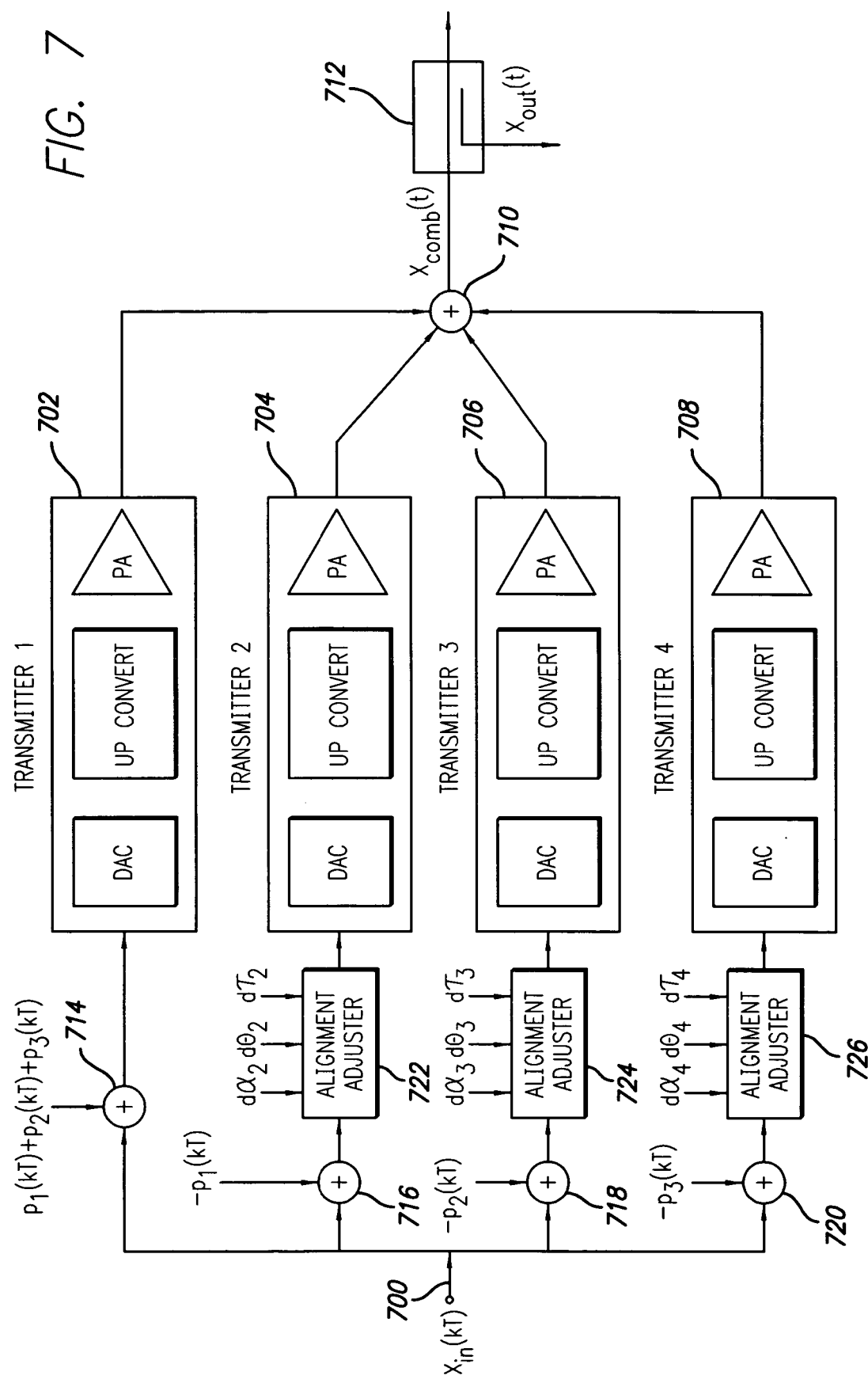
FIG. 7 is a block schematic drawing of a wireless transmission system in an alternate embodiment of the present invention employing multiple transmitter modules in a star configuration.

Referring to FIGS. 6 and 7 two different implementations suitable for three or more transmitter modules are illustrated. Referring first to FIG. 6, a first implementation of a four transmitter module communication system is illustrated. The four transmitter modules 602, 604, 606 and 608 receive and amplify the input signal at input 600 and the amplified signals are combined at combiner 610. The output is sampled by coupler 612 and the sampled output $x_{out}(t)$ is provided to the alignment control system, which may correspond to FIG. 1B described above but with additional pilot outputs and adjuster settings outputs as will be apparent from the signals in FIG. 6. Each of the four signal paths in FIG. 6 receives a separate pilot signal coupled at pilot inputs 614, 616, 618 and 620. At least three of the signal paths include alignment adjuster circuits 622, 624, 626 which receive gain, phase and delay signals from the control system processor to align the four signal paths for optimal combining by minimizing residual pilot power.

FIG. 7 corresponds to FIG. 6 in all respects other than the manner in which the pilot signals are distributed (like numerals are employed for like elements other than the first digit denoting the figure number, and the elements are not separately described). When assigning anti-phase pilot pairs, it is possible to distribute the pilots evenly amongst the transmitter modules in a ring pattern as shown in FIG. 6 or assign all the pilots to one module with the individual pilot pairs assigned to each of the remaining modules in a star pattern as shown in FIG. 7. Star patterns create a well-defined reference, allowing each transmitter module to be tuned to the reference module (transmitter 1 in FIG. 7). However, star patterns are not recommended for frequency or code domain pilot multiplexing because the reference transmitter module will have a disproportional increase in power due to the accumulated pilot energy. However, for time-multiplexed pilots there is no difference in power amplifier power between the ring or star pattern pairing approaches.

Once the alignment has been achieved, it is desirable to use the minimum number of pilot signals since pilot energy represents wasted power dissipated in the combiner. In such cases, a single 'group' pilot is used in each transmitter module; however, the individual pilot phases are offset such that the vector addition of the pilots at the combiner is zero when all the modules are matched. If mismatches are detected by the presence of residual pilot energy after combining, the alignment process is initiated using the above-mentioned pair-wise pilot approach. Although it is possible to align the individual transmitter modules using the group pilot, it is more difficult than the pair-wise approach and is not preferred.

Figure 8:
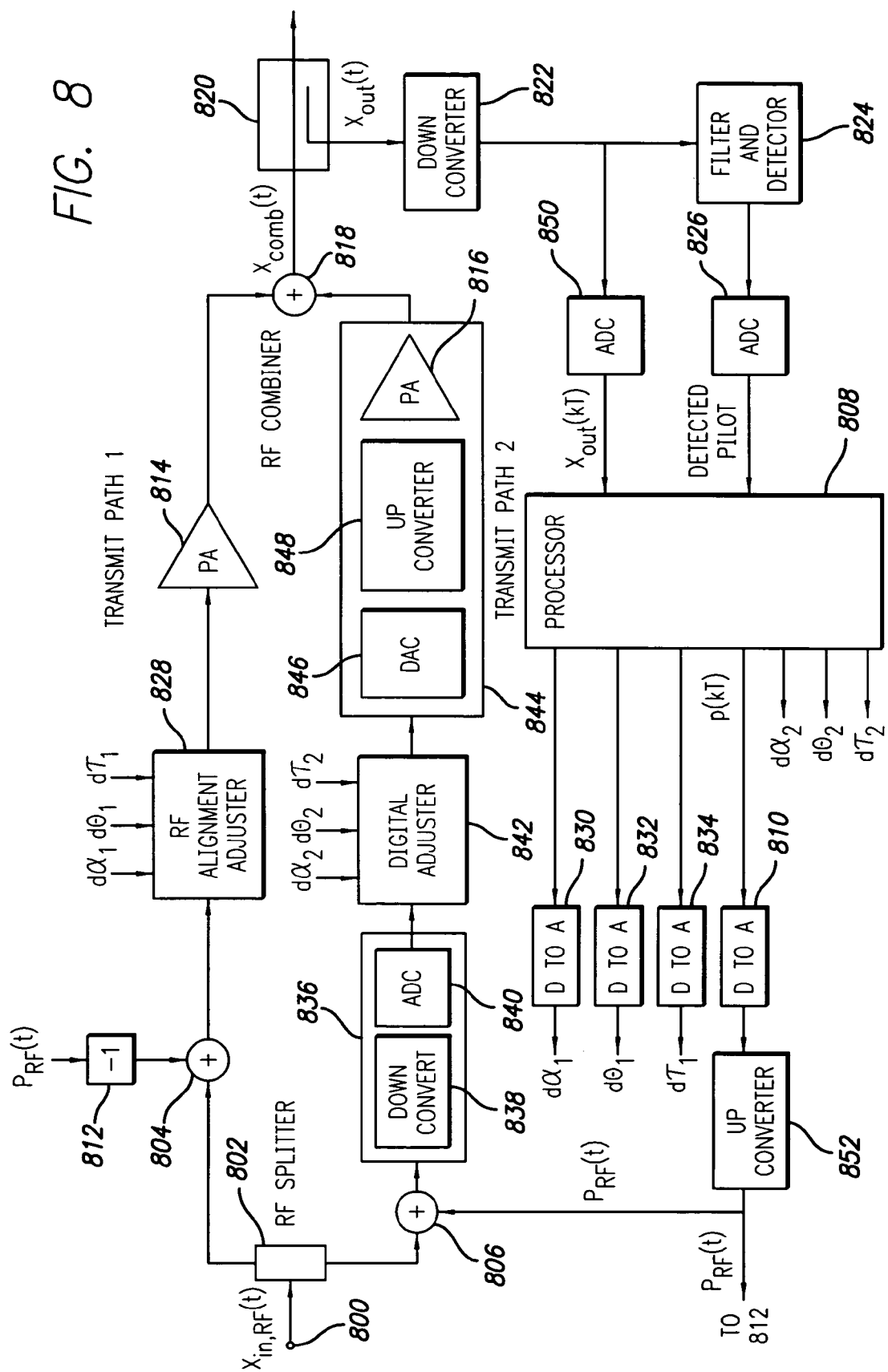
FIG. 8 is a block schematic drawing of a wireless transmission system in an alternate embodiment of the present invention adapted for receiving an analog RF input signal.

Referring to FIG. 8, an embodiment of a multi-transmitter communication system receiving an analog RF input communication signal is illustrated. Two transmitter modules are illustrated but three or more modules may also be employed and the implementation of such embodiments will be apparent to those skilled in the art from the above discussion of FIGS. 6 and 7. As shown, the input RF signal provided to input 800 is split to the two signal paths corresponding to the two transmitter modules by RF splitter 802. Analog anti-phase pilot signals are coupled to the two signal paths at couplers 804, 806. The pilot signal may be generated digitally by processor 808 and then converted to analog form by D to A converter 810 and up converted to RF by up converter 852. The anti-phase signal may be simply created by inverter 812 from the output of up converter 852. Each signal path comprises a power amplifier (PA) 814, 816, respectively, the outputs of which are combined at combiner 818. The combined output signal is sampled by coupler 820. The sampled output is processed to detect any residual pilot signal for control of combiner alignment. More specifically, the sampled output is down converted by down converter 822 and the down converted signal is filtered and pilot power is detected by circuit block 824, which may be implemented as described above in relation to FIGS. 2 and 3. Alternatively, a digital correlation detection may be employed, as described above in relation to FIG. 4. The detected pilot is then provided, via analog to digital converter 826, to processor 808. Processor 808 may perform a search algorithm as described above in relation to FIG. 5 and provide adjustment settings $d\alpha_1$, $d\theta_1$, $d\tau_1$ to RF alignment adjuster 828 via digital to analog converters 830, 832, 834, to minimize the detected pilot and optimize signal alignment at combiner 818. RF alignment adjuster 828 may comprise well known gain, phase and group delay circuits, of a type used in alignment of feed forward amplifiers.

Although both the signal paths in the communication system of FIG. 8 may be purely analog RF and alignment of the two paths controlled as described above, an optional additional digital stage in the second path is shown in FIG. 8. This comprises a digital converter stage 836, comprising an analog down converter 838 and analog to digital converter 840, a digital adjuster circuit 842, and an analog module 844 comprising digital to analog converter 846, up converter 848 and the power amplifier 816. This configuration allows digital adjuster signals $d\alpha_2$, $d\theta_2$, $d\tau_2$ to be provided to digital adjuster circuit 842 from processor 808. The digital adjuster signals may be used to further align the output $x_{out}(t)$ to reduce pilot or may be used in place of the analog adjuster signals. Also, these signals may be employed to predistort the input to power amplifier 816 to compensate for nonlinearities introduced by the amplifier transfer characteristic. In this regard, the sampled output $x_{out}(t)$ may be converted to digital form by ADC 850 and used by processor 808 to determine a distortion component in the output and compute updated predistortion coefficients. A variety of digital predistortion approaches and algorithms are known in the art, any of which may be implemented by processor 808.

When using the correlation method for pilot detection, the signal $x_{out}(kT)$ output by ADC 850 may also be used to determine if (Eq. 14), or (Eq. 18), is valid. That is, when the frequency of the pilot is changed to obtain the frequency diversity needed to resolve time delay, amplitude, and phase differences, it is preferred that (Eq. 14) be tested to ensure reliable measurements. If the test fails, another frequency may be tried.

It will be appreciated by those skilled in the art that various combinations of the above implementations may be employed and are implied herein. For example, a digital stage may be provided in both paths of the system of FIG. 8 and both paths may include digital predistortion in combination with combiner alignment. Similarly, in the case of a digital input signal, as described in relation to FIG. 1A and 1B, a digital predistortion operation may be combined with the digital alignment adjustment provided by adjuster 120. Various additional combinations of the specific implementations will also be apparent to those skilled in the art.

Accordingly, the specific embodiments described are not meant to be limiting in nature and the present invention covers many specific implementations too numerous to describe in detail.

What is claimed is:

1. A wireless communication system, comprising:
   an input for receiving a communication signal;
   a first signal transmission path coupled to the input and including a first power amplifier and a first pilot signal input receiving a first pilot signal;
   a second signal transmission path coupled to the input and including a second power amplifier and a second pilot signal input, coupled independently from said first signal transmission path, receiving a second pilot signal out of phase with said first pilot signal;
   a combiner coupling the output of the first and second signal transmission paths; and
   a pilot detector coupled to the output of the combiner for detecting any uncanceled pilot signal.

2. A wireless communication system as set out in claim 1, further comprising a signal adjuster in said first or second signal transmission path for adjusting at least one of the gain, phase or delay of the signal transmission path.

3. A wireless communication system as set out in claim 2, further comprising a control processor coupled to the pilot detector and the signal adjuster for controlling the signal adjuster to minimize the detected pilot signal.

4. A wireless communication system as set out in claim 1, wherein said input communication signal is a digital signal and wherein each of said first and second signal transmission paths further comprise a digital to analog converter and an up converter coupled between the input and the first and second power amplifier, respectively.

5. A wireless communication system as set out in claim 4, wherein said first and second pilot signals are digital signals.

6. A wireless communication system as set out in claim 1, wherein said input communication signal is an analog RF signal.

7. A wireless communication system as set out in claim 6, wherein at least one of said first and second signal transmission paths further comprises a down converter, an analog to digital converter, a digital to analog converter, and an up converter, coupled between the input and the power amplifier.

8. A wireless communication system as set out in claim 1, wherein said pilot detector comprises a down converter, a bandpass filter, and a signal power detector.

9. A wireless communication system as set out in claim 8, further comprising an analog to digital converter coupled between the down converter and the bandpass filter.

10. A wireless communication system as set out in claim 8, further comprising an analog to digital converter coupled to the output of the signal power detector.

11. A wireless communication system as set out in claim 1, wherein said pilot detector comprises a first input receiving the output of the combiner, a second input receiving the first pilot signal and a correlation detector.

12. A wireless communication system as set out in claim 11, wherein the correlation detector comprises a first filter coupled to the first input, a second filter coupled to the second input, and a mixer for mixing the outputs of the first and second filters.

13. A wireless communication system as set out in claim 12, wherein the pilot detector further comprises a down converter and an analog to digital converter coupled between the first input and the first filter.

14. A wireless communication system as set out in claim 11, wherein the correlation detector comprises a first Fast Fourier Transform circuit coupled to the first input, a second Fast Fourier Transform circuit coupled to the second input, a first weighting circuit coupled to the output of the first Fast Fourier Transform circuit, a second weighting circuit coupled to the output of the second Fast Fourier Transform circuit, and a mixer coupled to the outputs of the first and second weighting circuits.

15. A multi-transmitter communication system, comprising:
   an input for receiving a communication signal;
   a plurality of transmitter modules coupled to the input, each comprising a power amplifier;
   a combiner coupled to and receiving and combining the outputs of the plural transmitter modules; and
   a pilot signal source coupled to the plurality of transmitter modules and providing a respective plurality of pilot signals having relative phases so as to combine in an out of phase manner at said combiner when the transmitter modules are aligned.

16. A multi-transmitter communication system as set out in claim 15, wherein said pilot signal source provides plural pilot signals to one transmitter module and anti-phase pilot signals to the remaining plurality of transmitter modules, in a star configuration.

17. A multi-transmitter communication system as set out in claim 15, wherein said pilot signal source provides said pilot signals evenly to said plurality of transmitter modules in a ring configuration.

18. A multi-transmitter communication system as set out in claim 15, wherein said pilot signal source provides said pilot signals to pairs of said plurality of transmitter modules.

19. A multi-transmitter communication system as set out in claim 18, wherein at least one of said transmitter modules receives two or more pilot signals and anti-phase pilot pairs appear in two or more of the remaining transmitter modules.

20. A multi-transmitter communication system as set out in claim 19, wherein the pilot signals are multiplexed.

21. A method for aligning a communication system comprising at least first and second power amplifier modules in respective parallel signal paths receiving and amplifying an input signal, and a combiner combining the amplifier module output signals, said method comprising:
   providing out of phase pilot signals independently to respective ones of said parallel signal paths, so that the pilot signals combine out of phase when the system is aligned;

detecting any residual pilot signal at the combiner output; and adjusting at least one of the signal paths to minimize the detected pilot signal.

22. A method as set out in claim 21, wherein said detecting comprises detecting pilot signal power.

23. A method as set out in claim 21, wherein said detecting comprises detecting correlation between the pilot signal and the combiner output.

24. A method as set out in claim 22, wherein said adjusting comprises altering the gain, phase or delay of said at least one of the signal paths.

25. A method as set out in claim 24, wherein said adjusting comprises altering the gain, phase or delay and monitoring pilot power to determine a desired adjustment direction.

26. A method as set out in claim 25, wherein said adjusting further comprises adjusting the gain, phase or delay in increments in the desired direction until the detected pilot power reaches a minimum.

27. A method as set out in claim 23, wherein said detected correlation is a complex number and said adjusting comprises incrementally adjusting the transfer characteristic of at least one of the signal paths using said detected correlation.

28. A method as set out in claim 27, wherein said incremental adjustment employs a step size proportional to the magnitude of the complex number.

29. A method as set out in claim 28, wherein said incremental adjustment employs a direction corresponding to the sign of the complex number.

30. A method as set out in claim 23, wherein said detecting correlation comprises filtering the pilot and the combiner output and mixing the two filtered signals.

* * * * *